Figure 1:
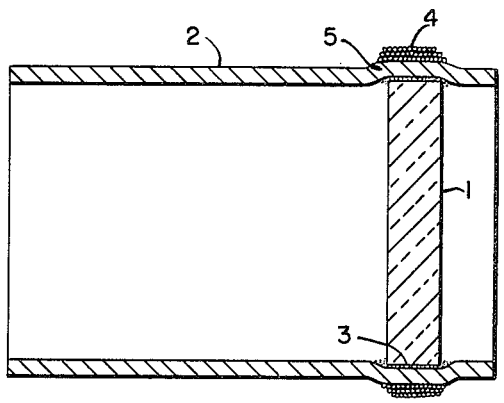

June 29, 1965  H. J. C. GEORGE  3,191,288

METHOD OF FORMING ASSEMBLIES INCORPORATING SOLDERED JOINTS

Filed Sept. 9, 1960

*INVENTOR.*
HENRI J. C. GEORGE

BY KENWAY, JENNEY, WITTER & HILDRETH

ATTORNEYS

United States Patent Office 3,191,288
Patented June 29, 1965

3,191,288
METHOD OF FORMING ASSEMBLIES INCORPORATING SOLDERED JOINTS
Henri J. C. George, Paris, France, assignor to Quartz & Silice S.A., Paris, France, a corporation of France
Filed Sept. 9, 1960, Ser. No. 55,031
Claims priority, application France, Sept. 10, 1959, 804,784, Patent 1,243,919
5 Claims. (Cl. 29—470.5)

This invention relates to assemblies incorporating soldered joints between materials having highly different coefficient of expansion, such as quartz and metal.

The preparation of fluid-tight soldered joints between materials which have highly different coefficients of expansion presents a difficult problem which has been satisfactorily solved only with regard to certain materials. This problem is particularly difficult where the soldered pieces must undergo widely varying temperature cycles, which tend to induce rupture as a result of the differing rates of thermal expansion of the materials. In the electronics industry, glasses having moderate coefficients of expansion relative to metals have been successfully soldered by developing special metal alloys whose coefficients of expansion are closely matched to those of the glasses. However, quartz glass has not been successfully soldered in this manner because it has a coefficient of expansion approximately six times lower than those of the glasses previously referred to, and thus much lower than that of any known metal alloys. A satisfactory quartz-to-metal joint is particularly important to the electronic industry, in which it is frequently desirable to provide a window of transparent quartz glass sealed tightly in a metal tube; one particularly important application is found in photomultiplier tubes. Such tube assemblies must be capable of undergoing subsequent treatment involving baking at several hundred degrees Centigrade, and also may be subjected to widely varying temperatures in use.

It is the primary object of this invention to provide an improved assembly, and a method for forming the assembly, incorporating a soldered joint between members having substantially different coefficients of thermal expansion, such as quartz and metal, which will remain fluid-tight when subjected to a wide range of temperatures.

Further objects and advantages of the invention will become apparent as the following description proceeds.

Briefly stated, in accordance with one embodiment thereof, I may carry out my invention by first metallizing the periphery of a member having a relatively low coefficient of expansion, and then inserting the member within a cylindrical tube or member having a relatively high coefficient of expansion and a small wall thickness, which circumferentially engages the periphery of the first member. The first member is preferably of such a diameter that it will fit closely into the interior of the tube when the latter is heated to a soldering temperature. I continue to heat the assembly to complete the soldered bond between the first member and the tube. I then wind about the outside of the tube one or more superposed layers of a filament of a material which has a substantially lower coefficient of expansion than that of the tube.

The material of the filament is of a kind which will substantially retain its mechanical strength and elasticity at the maximum temperature which is to be encountered in the further treatment of the tube or in its subsequent use. I prefer to form the filament of quartz, which maintains its strength and elastic properties at temperatures as high as 1000° C. The winding is carried out under a substantial tension, which is preferably only slightly less than the yield point of the filament. During subsequent heating of the assembly in treatment or in use, the filament winding exerts compression upon the tube because of its relatively low coefficient of expansion, and prevents the tube from expanding more rapidly than the first member and thus rupturing the soldered bond.

Figure 2:
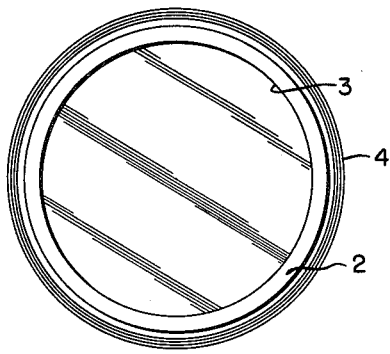

While the specification concludes with claims particularly pointing out the subject matter which I regard as my invention, it is believed that the invention will be better understood from the following detailed description of a preferred embodiment thereof, taken in connection with the accompanying drawing, in which:

FIG. 1 is an elevation in cross-section of an illustrative metal tube assembled with a quartz window member according to the invention; and FIG. 2 is an end view of the assembly of FIG. 1.

Referring to the drawings, a cylindrical quartz window member 1 is to be soldered within a thin-walled metal tube member 2. The form of the tube and window are merely illustrative of the invention, and these elements may assume any desired form, so long as the tube member is circumferentially spaced about the window member and in abutment therewith. For example, the window may have the form of an arcuate cylindrical segment abutting the interior wall of the tube.

Before inserting the window within the tube, I first metallize the periphery of the window at 3 in a conventional manner to coat the peripheral surface with a compound which will form a soldered joint between the window and the tube when subjected to heat. The window is preferably of such a diameter that it will fit closely into the interior of the tube when the latter is heated to the soldering temperature. I then insert the window in a desired position within the tube as shown, and continue to heat the assembly at a temperature sufficiently high to complete the soldered joint. The assembly is permitted to cool to room temperature, and the tube contracts to a greater extent than the window, stretching peripherally about the window to form a channel 5.

Subsequent to completion of the soldered joint, I wind the outer circumference of the tube with superposed layers of filaments 4 of a material having a substantially lower coefficient of expansion than the metal of the tube, and of a kind which will maintain its mechanical strength at the highest temperatures to which the assembly is to be subjected in subsequent treatment and use. The strength characteristics of the filaments are accordingly more uniform under varying temperatures than those of the metal tube. Because of its ability to maintain mechanical strength and elasticity at elevated temperatures as high as 1000° C., I prefer to use a quartz filament. The diameter of a quartz filament may vary over a wide range compatible with good winding characteristics, but is preferably selected in the range from one to thirty microns. Thinner filaments are difficult to draw continuously from a quartz rod, and thicker filaments are both fragile and difficult to wind.

In the winding step, I subject the filament 4 to a high degree of tension, preferably only slightly below its yield point. In the case of quartz filaments, tension in the range from 100 to 300 kilograms per square millimeter is preferably applied. The winding is carried on to a thickness of at least several millimeters. In the case of a quartz filament winding of two millimeters thickness, for example, a tangential compression force of 150 to 400 kilograms will be exerted on the tube over each millimeter of length thereof. The winding is secured in place by fusing the free end of the filament to the winding by means of a suitable torch, or other local heating means.

When the assembly is subsequently exposed to high temperatures, the winding subjects the tube to a substantial compressive force which restrains the tube from expanding freely and thus from rupturing the soldered joint. The winding, being formed of a material having good temperature strength characteristics, maintains its compression even at high temperatures, and is particularly effective at temperatures at which the metal of the tube becomes malleable and exhibits decreased thermal stress. A quarty filament is effective to maintain the soldered bond at temperatures as high as 1000° C.

In applications in which the assembly is to be heated during subsequent manufacturing operations, but is not to be subjected to a wide range of temperatures in use, the winding may be removed following the completion of the manufacturing operations. However, in the event the completed assembly will be subjected to substantial temperature variations in its subsequent use, the winding is permitted to remain in place on the assembly.

While I have described a preferred embodiment of my improved soldered joint, it will be apparent to those skilled in the art that various changes and modifications may be made without departing from the spirit and scope of the invention. I therefore tend to cover all such changes and modifications in the appended claims.

What I claim and desire to secure by Letters Patent of the United States is:

1. The method of forming a joint between a tube of solderable material and a member of solderable material having a substantially lower coefficient of expansion than the tube and abutting the interior of the tube, which comprises the steps of inserting the member in assembled relation in the interior of the tube, forming a soldered joint between the member and the tube, and winding a filament of quartz having a lower coefficient of expansion than the tube and capable of maintaining substantial strength at elevated temperatures about the tube under tension at a location circumferentially spaced about the member.

2. The method of forming a joint between a metal tube and a quartz window abutting the interior of the tube which comprises the steps of inserting the quartz window in assembled relation in the interior of the tube, forming a soldered joint between the window and the tube, cooling the soldered assembly to room temperature, and winding a filament of quartz having a lower coefficient of expansion than the metal tube and capable of maintaining substantial strength at elevated temperatures about the tube under tension at a location circumferentially spaced about the window.

3. The method recited in claim 2, in which the step of winding the filament about the tube is carried out under a tension slightly less than the yield point of the filament.

4. The method recited in claim 2, in which the step of winding the filament of quartz about the tube is carried out under tension in the range from 100 to 300 kilograms per square millimeter of cross-section of the filament.

5. The method of forming a joint between a metal tube and a quartz window abutting the interior of the tube which comprises the steps of metallizing a surface of the quartz window formed to abut the interior of the tube, inserting the quartz window in assembled relation in the interior of the tube, heating the assembly to solder the joint between the window and the tube, cooling the soldered assembly to room temperature, and winding a filament of quartz having a lower coefficient of expansion than the metal tube and capable of maintaining substantial strength at elevated temperatures about the tube under tension at a location circumferentially spaced about the window, and securing a free end of the filament to the winding.

References Cited by the Examiner
UNITED STATES PATENTS

| 2,728,425 | 12/55 | Day | 189—36.5 |
| 2,760,261 | 8/56 | Pawlyk et al. | 29—473.1 |
| 2,848,801 | 8/58 | Eber | 29—195 |
| 2,917,140 | 12/59 | Omley | 189—36.5 |
| 2,972,808 | 2/61 | Litton | 29—473.1 |

OTHER REFERENCES

Product Engineering, December 1947, pages 154–157, 29—473.1.

JOHN F. CAMPBELL, *Primary Examiner.*

WHITMORE A. WILTZ, *Examiner.*